Aug. 3, 1943.  G. H. DOWTY  2,326,019
LANDING GEAR OF AIRCRAFT
Filed Oct. 12, 1939
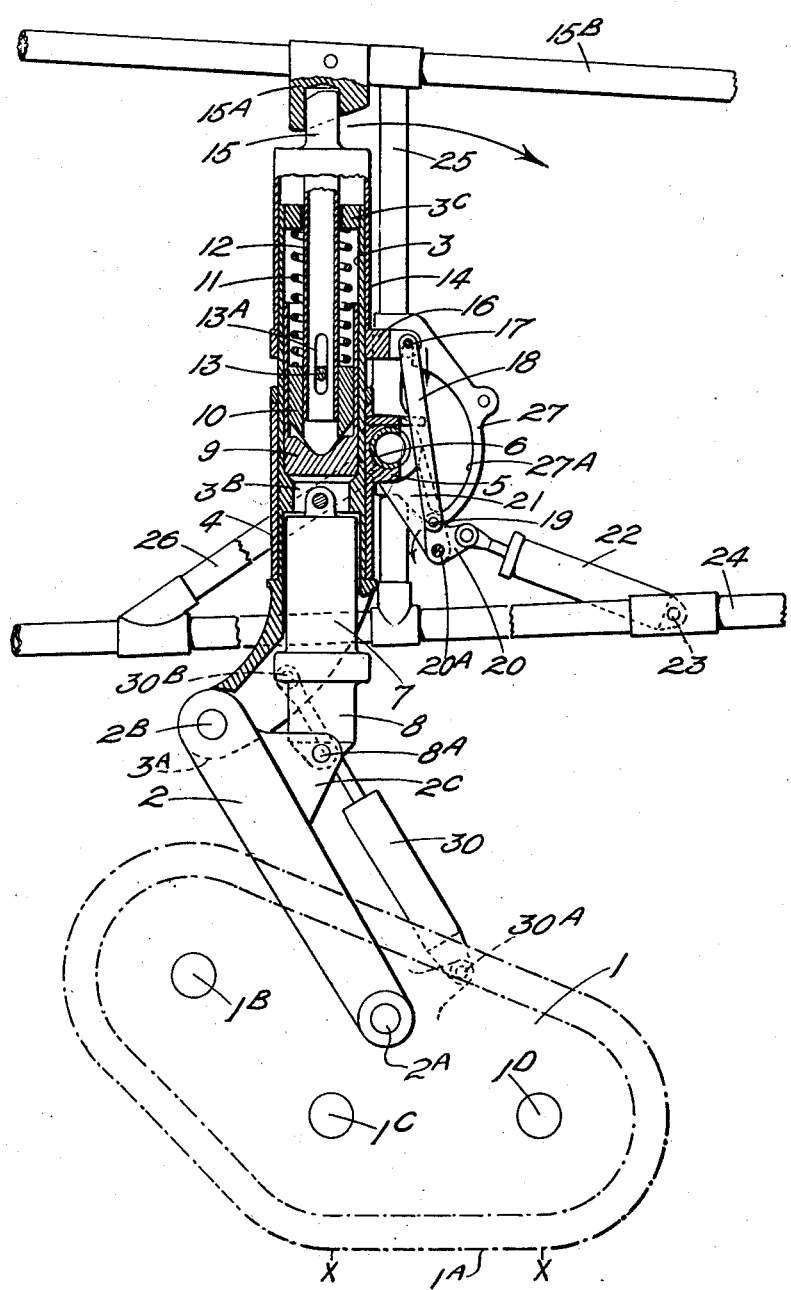
Inventor,
George Herbert Dowty
By:
Saulnier & Saulnier
Attny.s Patented Aug. 3, 1943

2,326,019

UNITED STATES PATENT OFFICE 2,326,019

LANDING GEAR OF AIRCRAFT

George Herbert Dowty, Cheltenham, England

Application October 12, 1939, Serial No. 299,202
In Great Britain September 17, 1938

6 Claims. (Cl. 244—102)

This invention relates to landing gear of aircraft which is required to be orientatable directionally, for example in the manner of a tail or nose wheel. An object of the invention is to distribute load upon the ground more effectively than heretofore, without unnecessarily increasing the size of the landing element. It will be obvious that, where a wheel and tire is used, if it be required to increase substantially the effective contact area on the ground, a very great increase of wheel-volume is required, with consequent increase in weight and difficulty of stowage if retraction be required. The invention seeks to overcome this difficulty by enabling an endless-track landing element to be used. A further object of the invention is to afford an endless-track unit and mounting means therefor which allow appropriate yielding for shock absorption. Another object, is to enable such a unit to be constrained in movement up and down, so as to ensure uniform and even load-distribution as between the track and the ground. Another object is to ensure directional manoeuvrability and make certain provisions in relation thereto. Another object is to provide for retraction, having regard to the need for directional alignment before or during retraction. Further objects, such as making a compact, robust, and efficient, nose or tail landing-gear unit, will be appreciated by those accustomed to the aircraft art, after an understanding of the following description of one form of the invention, in which reference is made to the accompanying drawing. The drawing is a partly sectional side elevation of a nose or tail landing-gear unit which is orientatable directionally and is retractable.

The track unit as a whole comprises a rigid frame 1 supporting an endless track 1A passing over rollers or the equivalent mounted in the frame, for example on the three centres 1B, 1C, 1D. The frame 1 is pivotally attached to a lever 2, at 2A. The lever 2 at its upper and forward end is pivotally attached at 2B to a lateral extension lug 3A of a sleeve 3. The sleeve 3 is rotatably borne in a tubular fitting 4, which has a lateral lug 5 whereby it is pivotally supported on a retraction pivot 6. The sleeve 3 forms, in effect, a mounting pillar. It has a transverse diaphragm or wall 3B to support pivotally the cylinder 7 of a telescopic shock absorber, of which the piston 8 is pivotally attached at 8A, to the lever 2, through the medium of a cranked part 2C of lever 2.

It follows that upward or landing loads on the track 1A are transmitted in such a way that lever 2 swings up and rearwardly, against the restraint of the shock absorber 7, 8. The shock absorber is virtually coaxial with the pillar mounting constituted by the sleeve 3, and is allowed just sufficient angular movement, to take account of the fore-and-aft component of movement of the pivot 8A. The sleeve 3 is rotatable in the fitting, and is not substantially movable axially therein.

To govern the directional orientation of the track unit, there is provided, fixed within the sleeve 3 on top of the diaphragm 3B, a centering cam 9, with which co-operates a second centering cam 10, which is slidable in the sleeve 3, being urged forcibly downwards by a compression spring 11 housed within sleeve 3. The cam 10 is rotationally locked to a non-rotating stem 12, by a transverse pin 13 of the cam 10, passing through axial slots 13A of the stem 12. The stem 12, passing clear through the end wall 3C of the sleeve 3 (which wall 3C incidentally acts as the abutment of the spring 11) is fixed with a locking sleeve 14 which is slidably and relatively rotatably fitted on the upper end of sleeve 3. The locking sleeve 14 has a lock pin 15 at its upper extrmity to co-operate with complementary parts of the aircraft structure, such as a ramped catch 15A fixed to a top longeron frame indicated at 15B.

The locking sleeve 14 has fixed to it a radial lug or projection 16. The outer end of this lug carries a pivot pin at 17, by which is attached a link 18, the other end of which is pivoted at 19 to a small bell crank 20, fulcrumed at 20A to a lever 21 which extends rigidly from the fitting 4, 5. To the bell crank 20 is also pivoted the piston of a double-acting retraction jack 22, anchored pivotally at 23 to a bottom longeron frame indicated at 24 (and interrupted, in the drawing, for clarity).

Between top and bottom longerons 15B, 24, extend frame members such as 25, braced if required by members such as 26. These members 25, 26, carry the retraction pivot 6, and also, rigidly, a quadrant frame 27. The frame 27 is notched to receive the pin 17 when the pillar is upright (non-retracted) and the sleeve 14 is up. The frame 27 also has an edge or surface 27A which is arcuate on the axis of pivot 6. Downward movement of the sleeve 14 is limited by abutment with the upper edge of the fitting 4.

The operation of the retraction and locking means is as follows: Assuming the landing element to be extended, as drawn, and the locks operative, that is to say, 15 engages 15A and 17 lies in its slot, the jack 22 is extended by applied pressure therein. The first jack action is to swing the bell crank 20 about 20A thereby applying tension in link 18, pulling down pin 17 and sleeve 14. Unlocking the device the bell crank 20 has rotated anti-clockwise about its pivot. Further extension of jack 22 operates, as if the jack piston were directly connected to lever 21 with the consequence that the whole mounting and track unit is swung about the pivot 6 in a clockwise direction and the track unit is retracted into any convenient stowage space in the aircraft. Conversely contraction of the jack 22 first of all swings the whole unit anti-clockwise, and as soon as pin 17 rides off the surface 27A, locking is permitted.

It is probably already clear that, sleeve 14 being prevented from rotation about the longitudinal pillar axis, the two cams 9 and 10 restrain rotation of the sleeve 3 and track unit in the directional sense and tend always to align the track unit in the fore-and-aft direction. It is arranged that the centre of load of the track 1A on the ground trails behind the castoring axis so that castoring effect is obtained. Indeed, preferably the whole of the bearing area of the track 1A, that is to say its area between approximately the two points marked "X" on the drawing, is behind the castoring axis.

An important problem that of stabilising the track unit about the axis 2A, is met by the invention in the following manner. Between a pivot attachment 30A and the frame 1, above and behind the pivot 2A and a pivot at 30B in the fitting 3A above and behind the axis 2B, is provided a link 30. This link is preferably adjustable in length and may be adjustable in flight, consisting in that case preferably of a double-acting hydraulic jack. The length of the link 30 defines the attitude of the track unit in its fore-and-aft vertical plane, i e., about the axis of the pivot 2A, the attachment of the track unit to the fitting 3A being practically or exactly a deformable parallelogram. The bearing surface between X—X of the track 1A remains horizontal or in the chosen attitude despite the swinging motion of the track unit involved in shock-absorber action. The fact that the track unit is arranged in trail and that in the unloaded condition (as drawn) lever 2 is much inclined downwards, gives rise to the effect that on initial contact with the ground in landing the shock absorber 7, 8, is resistant to drag load as well as to vertical load. The fact that the link 30 is adjustable enables the best setting for the attitude of the track unit to be selected, having regard to the particular type of aircraft, load conditions, or other factors, and this tends to ensure that a uniform ground load is applied to the track 1A, whereby the best condition of operation is achieved.

Whilst in the above practical example of the invention there is afforded retractability, castoring, self-aligning, and stabilising of the track unit fore-and-aft, it is to be understood that one or more of these factors may be omitted according to circumstance and the constructional details may be substantially varied. For instance, in applying the device in the location normally occupied by a nose wheel in an aircraft, it may in some circumstances be desirable to lock the device against castoring during landing or take-off, unlocking it again for taxiing. It may further be found desirable to provide the stabilising link 30 with some degree of resilience and to that end its contraction and extension from a mean position may be resisted by springs contained within it. Further, the relative disposition of the axes at 2A, 2B, 30A, 30B may be such that as the track unit swings up under ground load so its forward end is tilted slightly down relative to the aircraft, to compensate for the accompanying slight change in attitude of the aircraft relative to the ground; or the tilt may be upwards as experiment may determine to facilitate riding over obstacles under increased load.

What I claim is:

1. An aircraft landing gear comprising a bearing member adapted to be pivotally mounted upon an aircraft, a supporting column journaled in said bearing for free rotation therein, an endless track landing element carried upon said column, shock absorbing means interposed between said landing element and said column and a centering device for maintaining fore-and-aft alignment of said landing element comprising a cam member fixedly carried by said column, a second cam member reciprocably carried within said column, spring means carried within said column for continuously urging said second mentioned cam into engagement with said first mentioned cam, locking means mounted on said column for locking said landing element in extended position, means connecting said locking means and said aircraft to prevent rotation of said locking means, and means interconnecting said reciprocable cam with said locking means whereby said cam constantly urges said column to maintain a predetermined position with respect the aircraft.

2. An aircraft landing gear comprising a bearing member adapted to be pivotally mounted upon an aircraft, a supporting column journaled therein for free rotation, an endless track landing element carried by said column, a shock absorbing unit interposed between said landing element and said column, jack means associated with said bearing for causing rotation thereof for retraction and extension of said landing element, means carried within said column for continuously urging said landing element to assume a definite position with respect said column and locking means for securing said landing element in extended position comprising a locking pin reciprocably associated with said column, a lever interconnecting said pin with said jack means, a guide segment associated with said bearing member, a second locking pin carried by said lever arrangement for movement over said guide segment, said jack means being arranged to remove said second locking pin from a locking recess in said guide segment upon initial movement thereof and unlocking said first mentioned locking pin from a locking recess associated with the aircraft, subsequent movement of the jack means causing retraction of the landing element.

3. An aircraft landing gear comprising a bearing member adapted to be mounted upon an aircraft, a pillar journaled in said bearing member for rotation therein, means for positioning said pillar in substantially vertical position in an aircraft, a contilever arm, means pivotally mounting said arm on the lower end of said pillar and in trailing relation thereto, means for restraining vertical movement of said cantilever arm, an endless track landing element, means pivotally supporting said landing element upon the free end of said arm, and means interconnecting said landing element and said pillar constructed and arranged whereby the leading portion of said landing element may move upwardly in the pitching sense whereby the pitch attitude of said endless track element is vertically variable with respect to said pillar under landing and taxiing loads, rotation of said pillar in said bearing providing free castoring of said endless track landing element with respect to said aircraft.

4. In aircraft alighting gear, a support column, a rotatable mounting coaxially borne by the column to project from the foot thereof, a pivot carried by said rotatable mounting, lever means supported by and extending in trail of said pivot to swing up and down thereabout, an endless track landing element pivotally carried by said lever, shock absorber means connected between said lever and said mounting to resist swing of said lever under landing and taxiing loads, and means interconnecting said landing element and said mounting constructed and arranged whereby the leading portion of said landing element may move upwardly in the pitching sense whereby the pitch attitude of said endless track element is vertically variable with respect to said mounting under landing and taxiing loads, said mounting, lever and shock absorber turning as a unit with respect to said column under castoring influence.

5. In aircraft alighting gear, a support column, a rotatable mounting coaxially borne by the column to project from the foot thereof, a pivot carried by said rotatable mounting, lever means supported by and extending in trail of said pivot to swing up and down thereabout, an endless track landing element pivotally carried by said lever, shock absorber means connected between said lever and said mounting to resist swing of said lever under landing and taxiing loads, a centering device for maintaining fore and aft alignment of said landing element comprising a cam member fixedly carried by said mounting, a second cam member reciprocably carried within said mounting, spring means carried within said mounting and continuously urging said second mentioned cam into engagement with said first mentioned cam to maintain a predetermined position of said mounting with respect to said column, and means interconnecting said landing element and said mounting constructed and arranged whereby the leading portion of said landing element may move upwardly in the pitching sense whereby the pitch attitude of said endless track element is vertically variable with respect to said mounting under landing and taxiing loads, said mounting, lever and shock absorber turning as a unit with respect to said column under castoring influence.

6. In an aircraft alighting gear, a rotatable support column, means pivotally supporting a lever thereon, said lever extending in trail of said pivot for vertical movement thereon, an endless track landing element pivotally carried by said lever, shock absorber means connected between said lever and said column to resist vertical motion thereof, and means interconnecting said landing element and said column constructed and arranged whereby the leading portion of said landing element may move upwardly in the pitching sense whereby the pitch attitude of said endless track element is vertically variable with respect to said column under landing and taxiing loads, said rotatable column providing means for castoring said endless track landing element with respect to the aircraft upon which it is carried.

GEORGE HERBERT DOWTY.